United States Patent Office 3,718,335
Patented Feb. 27, 1973

3,718,335
HYDROSTATIC RING SEAL CONSTRUCTION
Robert Dernedde, Frankenthal, Pfalz, and Heinz Freese, Mannheim, Germany, assignors to Klein, Schanzlin & Becker Aktiengesellschaft, Frankenthal, Pfalz, Germany
Filed July 30, 1970, Ser. No. 59,490
Int. Cl. F16j 15/16
U.S. Cl. 277—26     12 Claims

ABSTRACT OF THE DISCLOSURE

A shaft is surrounded by and fixed with a first annular sealing member, and the latter in turn is surrounded by a pair of second annular sealing members. These second annular sealing members have juxtaposed axial sealing faces which define with one another a radial gap. Each of the second members includes an annular supporting portion, an annular sealing portion fixed with the supporting portion and having one of the axial sealing faces mentioned before, and an annular stabilizing portion. One of the portions is flanked at its opposite axial sides by the other two annular portions and is composed of a material the coefficient of thermal expansion of which is either larger or smaller than that of the other two annular portions.

BACKGROUND OF THE INVENTION

The present invention relates to sealing constructions, and more particularly to ring seals. Still more specifically the present invention relates to hydrostatic ring seals.

It is already known to construct contactless sliding ring seals, so-called hydrostatic sliding ring seals, which are used particularly but not exclusively in sealing of shafts under very high pressures. Such seals are particularly important in applications such as reactor pumps and boiler water feed pumps. Essentially they comprise a stationary sliding ring and a sliding ring which rotates with the shaft to be sealed, and the two define between themselves a radial sealing gap.

The construction of these sliding ring seals is such that the pressure developing in the radial gap will always maintain the two sliding rings out of contact with one another when it exceeds a predetermined minimum differential pressure. In other words, high pressures are reduced by throttling via the radially directed gap.

In the known constructions the sliding rings are composed of two portions. An annular supporting portion of a material having high mechanical resistance has mounted on it a so-called insert ring or annular insert which in itself is provided with the actual sealing surface defining the radial gap with a similar sealing surface provided on a similar annular insert of the other ring. The annular insert is made from a material having high corrosion resistance. The two annular portions, that is the supporting portion and the annular insert, thus are made of different materials in correspondence with their different functions. This, however, has the significant disadvantage that temperature fluctuations resulting in differential thermal expansion of the different materials of the two annular members of which each of the rings is composed, may cause the rings to become warped. If the rings would only increase in their diameter in radial direction, this would not be too objectionable; however, what frequently occurs is a non-radial warping or a warping wherein radial and non-radial components of deformation are combined, and the resultant changes in the geometry of the annular sealing gap bring with them a substantial reduction in the operational efficiency of the seal.

Heretofore it has seemed as if such warping was impossible to avoid, simply because any temperature fluctuations of liquid flowing through the annular sealing gap will also affect the supporting portion and the annular insert. Thus, if the water or liquid becomes heated, the sliding rings will similarly become heated. In many cases it is necessary to construct the annular inserts or insert rings from a material having a very low coefficient of thermal expansion, for instance ceramic material. If this is the case, the annular supporting portion or annular supporting ring used in conjunction with the annular insert ring expands more strongly than the latter, necessarily being of a different material, and the high pressure existing in the annular sealing gap presses the two rings tightly together so that they cannot slide with reference to one another because of the great contact friction between them. The shear stresses acting at the interface between the supporting ring and the insert ring then will warp the rings with the result that the aforementioned disadvantageous changes in the operation efficiency of the seal are observed.

SUMMARY OF THE INVENTION

It is, accordingly, an object of the present invention to overcome the aforementioned disadvantages.

More particularly it is an object of the present invention to provide an improved hydrostatic sliding ring seal which is not possessed of the aforementioned difficulties.

An additional object of the present invention is to avoid or keep within acceptable limits the warping of the annular components in hydrostatic ring seals of the type under discussion.

In pursuance of the above objects, and others which will become apparent hereafter, one feature of the invention resides in a hydrostatic sliding ring seal construction which, briefly stated, comprises a shaft and a first annular sealing ring surrounding and fixed with the shaft. A pair of second annular sealing members surround the first member and have juxtaposed axial sealing faces which define with one another a radial gap. Each of the second members includes an annular supporting portion, an annular sealing portion fixed with the supporting portion and having one of the aforementioned axial sealing faces, and an annular stabilizing portion. One of the annular portions of each of the second annular sealing members is flanked at its opposite axial sides by the other two annular portions of the same annular sealing member and is composed of a material having a coefficient of thermal expansion which counteracts the coefficient of thermal expansion of the other two annular portions.

The annular stabilizing portion which is provided in accordance with the present invention may be located at the axial side of the annular supporting portion which faces away from the annular sealing portion, or it may be located between the annular sealing portion and the annular supporting portion. It may separate the annular sealing portion and the annular supporting portion completely or partially. The coefficients of thermal expansion of the annular sealing portion, the annular supporting portion and the annular insert portion are so selected that whichever one of the three portions is in the middle and flanked at its opposite axial sides by the other two portions, has a coefficient of thermal expansion which is either higher or lower than the two outer annular portions. The coefficient of thermal expansion of the two outer annular portions need not be identical, that is the coefficient of one of the outer annular portions may be different from that of the other outer annular portion, as long as they both differ from the coefficient of thermal expansion of the middle annular portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
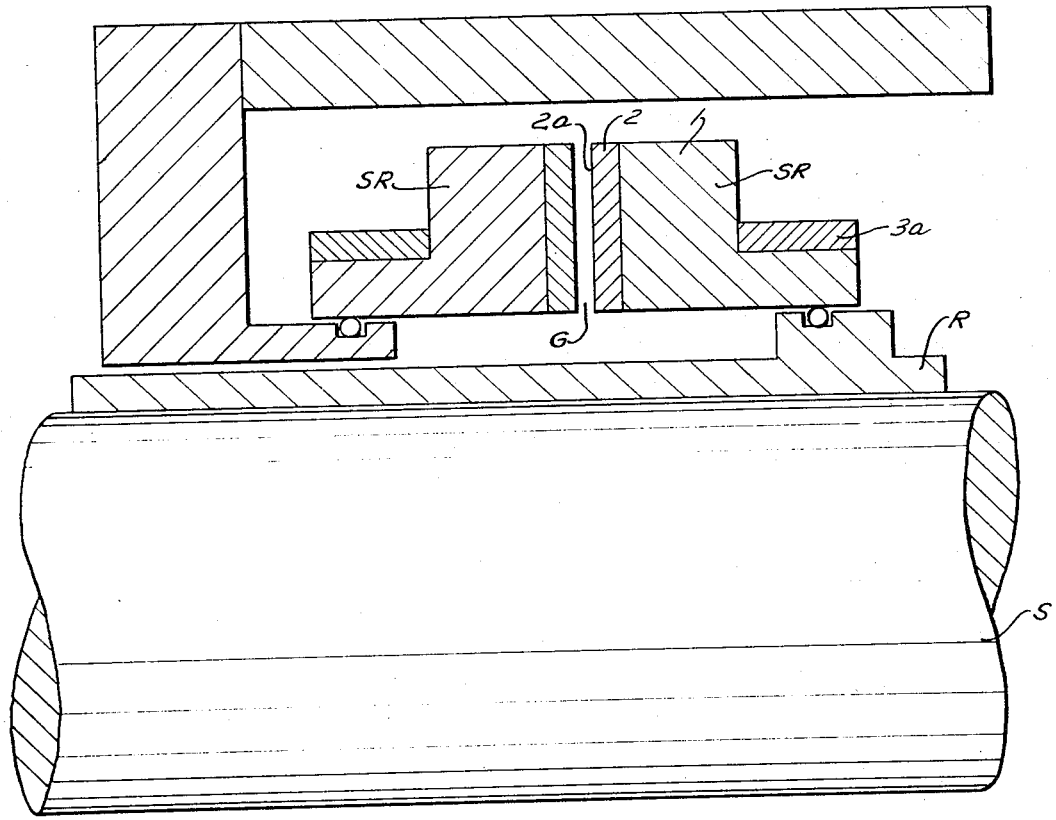
FIG. 1 is a schematic fragmentary partly sectioned view illustrating one embodiment of the invention.

Discussing firstly FIG. 1 it is pointed out that the significant details of the construction and operation of a hydrostatic sliding ring seal of the type here under discussion are well enough known so as not to require a detailed discussion. They are of no consequence for the purposes of the present invention, and for an understanding of the present invention it is only necessary to realize that in a hydrostatic sliding ring seal construction one of the rings rotatable with reference to the other about the shaft with which the seal is associated, and that liquid will flow through a radial gap defined between juxtaposed sealing faces of the two rings.

Keeping this in mind it will be seen that in the embodiment of FIG. 1 there is illustrated a shaft S which is to be sealed in an installation in which the shaft is utilized and mounted for rotation. The shaft S is surrounded over a portion of its axial length by a first annular ring member R which in turn is surrounded by two sealing ring members SR. In the illustrated embodiment the construction of each of the sealing ring members SR is identical, and therefore only one of the members SR will be discussed in detail.

As FIG. 1 shows, each of the members SR is composed of an annular supporting portion 1 which of course surrounds the member R and the shaft S confined therein, and secured to one axial end of the annular supporting portion 1 is an annular insert portion or sealing portion 2. One axial end face of the latter, in turn, is a sealing face 2a which defines with a corresponding sealing face of the other annular sealing portion 2 a radial gap G.

According to the present invention each of the members SR is further provided with an annular stabilizing portion 3a which in the embodiment of FIG. 1 is mounted so as to surround a reduced-diameter axial end portion of the annular supporting portion 1, as illustrated. The stabilizing portion 3a in FIG. 1 is located at the axial end of the supporting portion 1 which is remote from the annular sealing portion 2. In the embodiment of FIG. 1 the main cross-sectional extension of the annular stabilizing portion 3a is axial, both with respect to the axis of the portion 3a as well as with the axis of the member SR as a whole.

Figure 2:
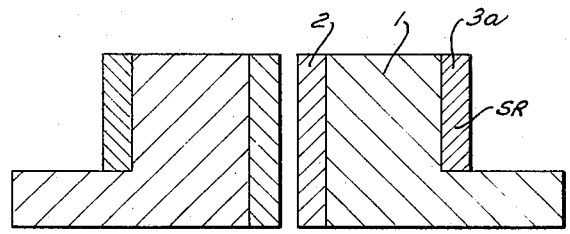
FIG. 2 is a fragmentary sectional detail illustrating a further embodiment of the invention which can be substituted for the inventive embodiment shown in FIG. 1.
Figure 3:
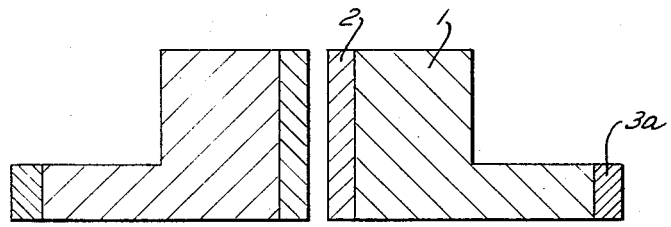
FIG. 3 is a view similar to FIG. 2 illustrating still another embodiment.

However, FIG. 2 shows that the cross-sectional configuration of the annular stabilizing portion 3a can also be different. Specifically, in FIG. 2, the members SR correspond to those shown in FIG. 1 and must be imagined to be mounted in the same manner in which the ones in FIG. 1 are mounted. In FIG. 2 it will thus be seen that the cross-sectional configuration of the stabilizing portion 3a can also have its major extension in radial direction. Other configurations are also possible and their selection may depend on the configuration of the annular supporting portion 1 and/or the type of materials used. For instance, the cross-section can be quadratic and the annular stabilizing portion 3a can be arranged differently from what is shown in FIGS. 1 and 2. Thus, FIG. 3 shows the annular supporting portion 3a located at the axial end face of the reduced-diameter portion of the annular supporting portion 1, namely that axial end face which is remote from the annular sealing portion 2 as shown in FIG. 3. Here, again, the major cross-sectional extension of the annular stabilizing portion 3a is radial rather than axial as in FIG. 1.

With respect to all of these embodiments it is pointed out that the annular stabilizing portion 3a may be connected with the remaining components of the respective member SR—that is either with the annular supporting portion 1 or with the annular supporting portion 1 and the annular sealing portion 2—in different ways, for instance metallurgically or mechanically; however, where the pressure conditions permit it a separate securing of the annular stabilizing portion 3a to the annular supporting portion 1 may even be entirely omitted and it will then be simply put in place.

If the annular sealing portion 2 is made of ceramic material or materials, the coefficient of thermal expansion of such material is substantially less than the coefficient of thermal expansion of the adjacent annular supporting portion 1 which necessarily consists of different material. In this case a material is selected for making the annular stabilizing portion 3a having a coefficient of thermal expansion which is less than that of the annular supporting portion 1. Upon heating of the various components this results in the action of an additional moment of force upon the annular supporting portion 1 which counteracts and balances the shear forces between the annular supporting portion 1 and the annular sealing portion 2, and which thus prevents the undesired warping which heretofore has always been objectionable and was never avoidable.

Figure 4:
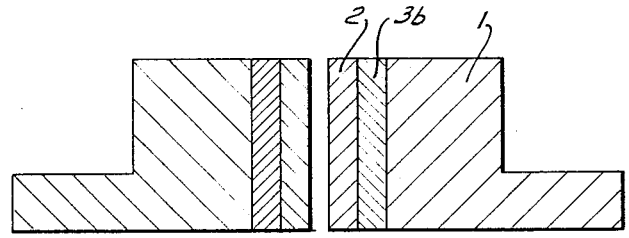
FIG. 4 is a view analogous to FIG. 3 but illustrating yet a further embodiment of the invention.

In the embodiment illustrated in FIG. 4 the annular stabilizing portion is identified with 3b and is arranged—contrary to the preceding embodiments—between the annular supporting portion 1 and the annular sealing portion 2. Here also it is assumed that the annular sealing portion 2 has a low coefficient of thermal expansion so that, in order to obtain the desired stability of the slide ring members SR—that is their resistance to warping or deformation—a material having an extremely high coefficient of thermal expansion is used for the annular stabilizing portion 3b.

If the cross-sectional areas of annular stabilizing portion 3b and annular supporting portion 1 are changed in a sense that the surface area of the annular stabilizing portion 3b becomes larger and that of the annular supporting portion 1 becomes smaller, then the annular stabilizing portion 3b may be made of a material having a very small coefficient of thermal expansion.

Essential in this embodiment is the necessity that the coefficient of thermal expansion of the annular stabilizing portion 3b must always either be larger or smaller than the coefficient of thermal expansion of the annular supporting portion 1 and the annular insert portion or annular sealing portion 2, it being understood that the coefficient of thermal expansion of the portions 1 and 2 must not be identical.

By way of example and for a better understanding of the invention it may be pointed out that, if it is assumed that the annular supporting portion 1 is composed of a material such as steel or the like which has a relatively high coefficient of thermal expansion, then the annular supporting portion 1 will have the tendency upon being heated to expand substantially more than the adjacent annular sealing portion 2 which consists for instance of ceramic materials such as aluminum oxide or a material known as Invar, which have a substantially lower coefficient of thermal expansion. If combined by themselves, as known from the prior art, the portions 1 and 2 would warp for the reasons discussed above, because of the differential expansion tendencies of their materials. The provision of the annular stabilizing portion 3a (or 3b), however, opposes the warping tendency in that imposes on the system composed of the portions 1 and 2 a deformation force acting in the direction opposite to the force tending to deform the portions 1 and 2, so that the total system composed of the three portions 1, 2 and 3a (or 3b) is capable of remaining balanced and therefore non-warped even where asignificant temperature differences exist. Of course, the material of the stabilizing portion and thus the necessary coefficient of thermal expansion, the position of the stabilizing portion in the total system composed of the three portions, and the cross-sectional configuration of the stabilizing portion are so selected that the forces and moments will balance and counteract one another within the system composed of the three portions without resulting in warping or deformation.

Figure 5:
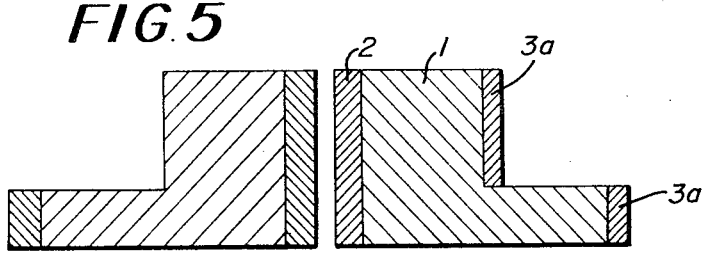
FIG. 5 is a view similar to FIG. 3 but of an additional embodiment.

FIG. 5, finally, shows that at least one of the members SR may be provided with two of the portions 3a which may both be located at a side of portion 1 which is remote from portion 2, or of which at least one may be located at this side while the other portion 3a may be located at a side of portion 1 which is adjacent to portion 2.

It will be understood that each of the elements described above, or two or more together, may also find a useful application in other types of constructions differing from the types described above.

While the invention has been illustrated and described as embodied in a hydrostatic ring seal construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A hydrostatic ring seal construction, comprising a shaft; a first annular sealing member surrounding and fixed with said shaft; and a pair of second annular sealing members surrounding said first member and having juxtaposed axial sealing faces which define with one another a radial gap, each of said second members including an annular supporting portion, an annular sealing portion fixed with said supporting portion and having one of said axial sealing faces, and annular stabilizing means being composed of material having a coefficient of thermal expansion selected for counter-acting the warping moment caused by different coefficients of thermal expansion of said annular portions.

2. A seal construction as defined in claim 1, wherein said coefficient of thermal expansion of said means is higher than the coefficient of thermal expansion of said annular portions.

3. A seal construction as defined in claim 1, wherein said coefficient of thermal expansion of said means is lower than the coefficient of thermal expansion of said annular portions.

4. A seal construction as defined in claim 1, said supporting portion having two axial end portions, said sealing portion being positioned at one of said axial end portions and said stabilizing means being annular and positioned at the other of said axial end portions.

5. A seal construction as defined in claim 4, wherein said other axial end portion has a reduced outer diameter, and wherein said stabilizing means surrounds said other axial end portion.

6. A seal construction as defined in claim 4, wherein said other axial end portion has a radially inner annular zone provided with said stabilizing means.

7. A seal construction as defined in claim 4, wherein said other axial end portion has a reduced outer diameter, thereby forming said radially inner annular zone.

8. A seal construction as defined in claim 1, said supporting portion having two axial end faces one of which has a smaller diameter than the other, said sealing portion being positioned on said other axial end face and said stabilizing means being annular and positioned on said one axial end face.

9. A seal construction as defined in claim 1, wherein said means consists of a substance selected from the group composed of Invar and ceramics.

10. A seal construction as defined in claim 1, wherein said stabilizing means is annular, said stabilizing means having a relatively large cross-sectional area and said supporting portion having a relatively small cross-sectional area.

11. A seal construction as defined in claim 1, at least one of said sealing members comprising at least one additional stabilizing means, and wherein both of said stabilizing means are located at an axial side of said supporting portion which is remote from said sealing portion.

12. A seal construction as defined in claim 1, at least one of said sealing members comprising at least one additional stabilizing means, and where in at least one of said stabilizing means is located at an axial side of said supporting portion which is remote from said sealing portion.

References Cited

UNITED STATES PATENTS

| 2,531,079 | 11/1950 | Payne | 277—96 X |
| 2,628,852 | 2/1953 | Voytech | 277—96 X |
| 3,481,638 | 12/1969 | Dryden | 277—235 R |

FOREIGN PATENTS

| 137,860 | 7/1950 | Australia | 277—96 |

EDWARD J. EARLS, Primary Examiner